Aug. 19, 1958　　　　　　S. J. SMITH　　　　　　2,848,669
SERVOSYSTEM WITH DISC TYPE SERVOMOTOR
Filed Aug. 19, 1953　　　　　　　　　　　　2 Sheets-Sheet 1

INVENTOR.
Stanley J. Smith
BY
Churchill, Rich, Weymouth & Engel
Attorneys

INVENTOR.
Stanley J. Smith
BY
Churchill, Rich, Weymouth & Engel
Attorneys

United States Patent Office 2,848,669
Patented Aug. 19, 1958

2,848,669

SERVOSYSTEM WITH DISC TYPE SERVOMOTOR

Stanley J. Smith, Briarcliff, N. Y., assignor to Simmonds Aerocessories, Inc., Tarrytown, N. Y., a corporation of New York Application August 19, 1953, Serial No. 375,188

12 Claims. (Cl. 318—28)

This invention relates to electrical servo apparatus and to servo systems wherein unbalance conditions existing in a balanceable network are automatically corrected by a reversible electric motor to restore network balance and to operate a follow-up, computing or indicating device as required by the particular installation.

Servo systems of the above type are employed in numerous applications demanding motors having widely differing operational characteristics. A typical system, and one which is particularly suited to the present invention, involves a gauge for continuously and automatically measuring the quantity of a non-gaseous dielectric fluid or solid present in a container. An example is a gauge for measuring the quantity of fuel in a tank carried by an aircraft. As will be readily appreciated, such gauges must be extremely accurate and capable of following the slightest variations in fuel quantity.

Various arrangements have been proposed in the past for the above purpose; however, all of these prior systems have employed motors which are comparatively ill suited for gauge operation.

The type of gauge referred to employs a sensing capacitor, such as the one disclosed in U. S. Patent No. 2,582,399, granted January 15, 1952, which is inserted into the tank and electrically connected in one arm of a bridge circuit. A reference or comparison capacitor is connected in a second arm of the bridge. Either the reference capacitor is adjustable or means are provided for varying the magnitude of the voltage applied to the reference capacitor, either adjustment being used to maintain the bridge in a balanced state. As is well known with circuits of this type, an output voltage can be obtained which varies in magnitude depending upon the extent of unbalance of the bridge and which is either in phase or 180° out of phase with the voltage energizing the bridge depending upon the direction of unbalance.

The output of the bridge is then amplified, if necessary, and applied along with a reference voltage in phase with the bridge energizing voltage to the windings of a two-phase motor. The motor in turn is coupled either to the reference capacitor or the other means for balancing the bridge and thus, when energized by both the reference voltage and the bridge output, operates to rebalance the bridge, reducing its output to zero. The rotation of the motor armature is proportional to the change in capacity of the sensing capacitor. Therefore, connecting an indicator to the motor provides a reading of the quantity of fuel in the tank.

Heretofore squirrel-cage type induction motors have been employed in the above-mentioned fluid gauges. Some of the disadvantages inherent in this type of motor include high starting current requirements, high no-load speed, low winding impedance, and low inherent damping. The need for high starting current can only be met either by the provision of considerable amplification with its resultant increase in equipment or by sacrifice in sensitivity. Neither solution is desirable on aircraft. The high speed of the rotor, which is dictated by practical considerations, necessitates the use of considerable reduction gearing, say of the order of 3600 to 1. Space limitations make it substantially impossible to obtain field windings of sufficiently high impedance to match the impedance of the control amplifier. This necessitates the use of costly matching transformers. Finally the low inherent damping makes hunting a considerable problem.

It is therefore an object of the present invention to overcome the various disadvantages noted above by providing a novel servo system employing a reversible induction motor of unique construction.

It is a further object of the present invention to provide an electrical servo system having such improved sensitivity or resolution that it is capable of responding to and correcting even relatively small error signals or unbalance voltages occurring therein.

A still further object of the invention is to provide a novel servo-motor for use in a servo system which is capable of extremely rapid rebalancing of the system without the attendant disadvantage of objectionable hunting.

In satisfying the above objects as well as those not specifically enumerated, the invention provides a disc type motor having high impedance windings and low rotor inertia which, when operating under the control of a suitably biased servo amplifier, is also characterized by substantial derivative or rate of induction disc flux cutting damping. Both "one-speed" and "two-speed" embodiments are provided.

Further objects and advantages, as well as a better understanding of the invention, will be had from reading the following detailed description in conjunction with the accompanying drawings in which:

Fig. 3 is a detailed fragmentary perspective view of the motor speed control switch shown in Figs. 1 and 2;

Fig. 4 is a plan view of a cam ring as employed in Figs. 1 and 2 permitting adjustable operation of the low-level and high-level monitoring switches for the system; and Fig. 5 is a fragmentary view of a modification of the braking magnet of Fig. 1.

Throughout the drawings like reference numerals are intended to designate identical parts.

Figure 1:
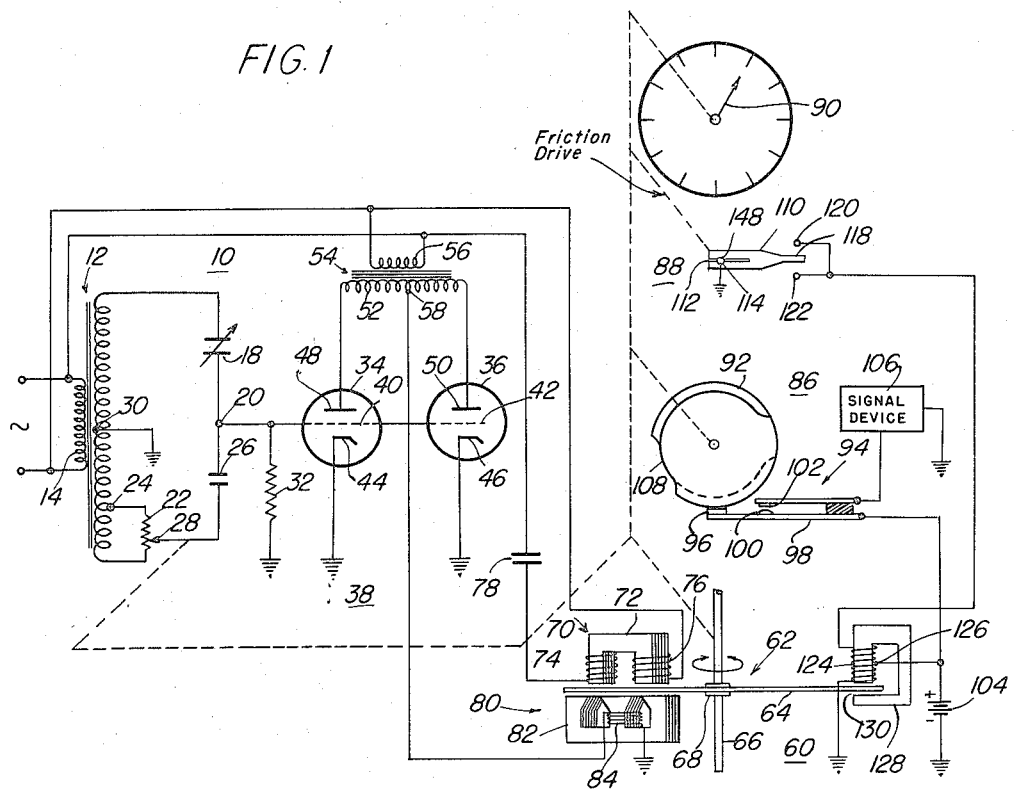
Figure 1 is a partly schematic, partly diagrammatic illustration of a fluid contents gauge servo system embodying the present invention.

Referring to Fig. 1, there is indicated schematically at 10 a capacitance-type bridge for a gauge of the type described above for measuring the quantity of a non-gaseous dielectric fluid present in a container. A bridge transformer 12 has its primary winding 14 connected to a source of alternating voltage, such as the 400 cycle, 115 volt supply available in an aircraft. One end of the secondary winding 16 is connected to one side of a sensing or measuring capacitor 18. The other side of capacitor 18 is connected to the bridge output terminal 20 completing the measuring arm of the bridge. The capacitor 18, which may take the form of that disclosed in the above-mentioned U. S. Patent 2,582,399, is normally mounted vertically in a fluid container (e. g., an aircraft fuel tank) for immersion in the fluid to substantially the full fluid depth. Thus, the fluid is received between opposed electrode surfaces and the capacitance of the capacitor becomes a function of the fluid level and fluid quantity present in the container.

Figure 2:
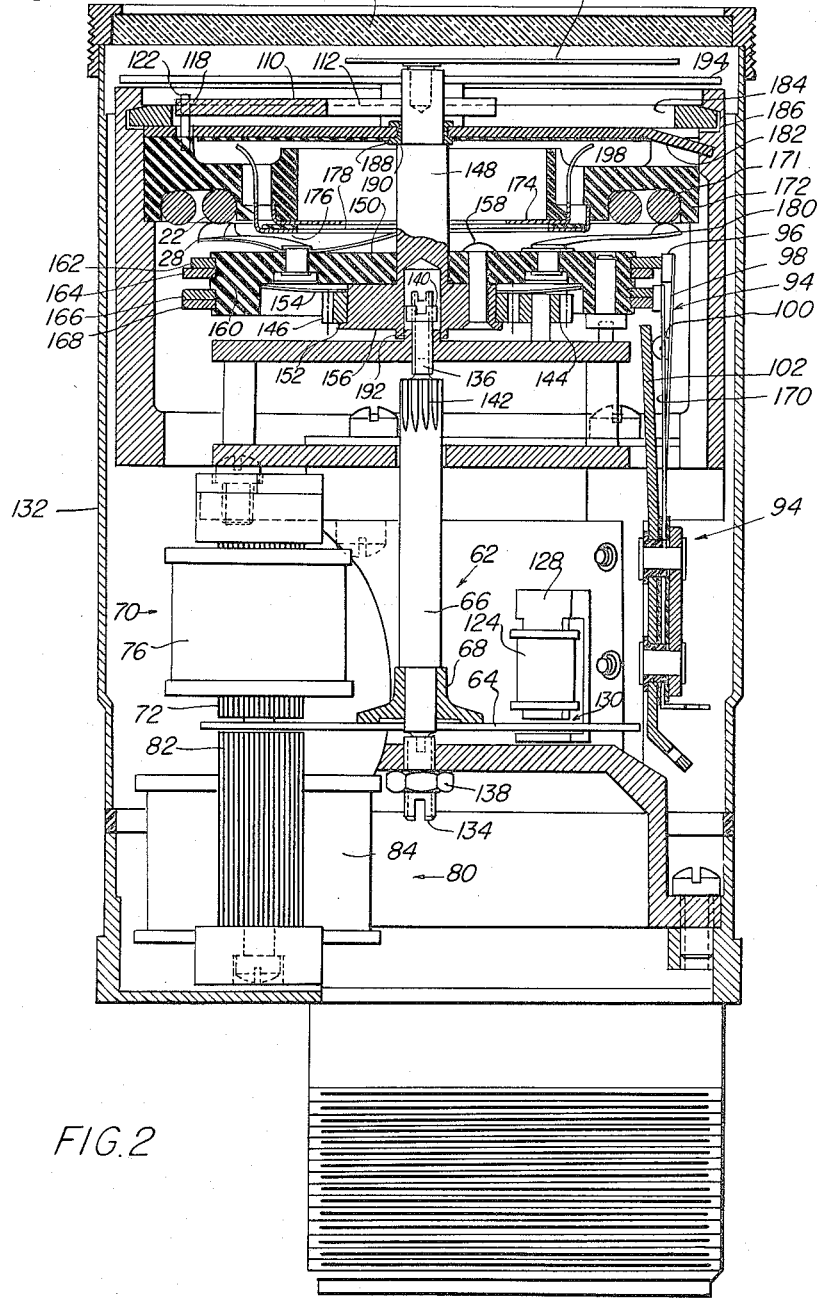
Fig. 2 is a vertical sectional view showing in detail one form of the indicator assembly illustrated diagrammatically in Figure 1.

The other end of secondary winding 16 is connected to one end of a rebalancing potentiometer 22, the other end of which is connected to a tap 24 on the secondary. Reference to Fig. 2 will show the details of potentiometer 22 which consists of a wire wound toroid engaged by the centrally mounted slider 28. Again referring to Fig. 1, a reference or comparison capacitor 26 is connected between the slider 28 of the rebalancing potentiometer and the bridge output terminal 20.

A tap 30 at the center of the secondary 16 is connected to ground, the bridge output being developed between terminal 20 and ground. The output of bridge 10 is connected across resistor 32 which functions as the grid resistor for tubes 34 and 36 of amplifier 38. As shown, resistor 32 is connected between terminal 20 and ground while the grids 40 and 42 of tubes 34 and 36 are connected together and to terminal 20. The cathodes 44 and 46 of the tubes 34 and 36 are connected to ground while the respective anodes 48 and 50 are connected to opposite ends of the secondary winding 52 of a transformer 54. The primary 56 of transformer 54 is connected to the energizing voltage in parallel with primary 14 of transformer 12. The secondary winding 52 of transformer 54 is center-tapped at 58.

In order to adjust the rebalancing potentiometer 22 and furnish an indication of the quantity of fuel in the tank there is provided a servo-motor designated generally by the numeral 60. Reference should be had to both Figs. 1 and 2. Motor 60 comprises generally a rotor 62 in the form of a substantially flat non-magnetic disc 64 of electrically conductive material. The rotor is preferably a thin aluminum disc and is mounted on a central shaft 66 for reversible rotation. Shaft 66 extends perpendicularly through a central aperture in the disc and is fixedly attached to the disc by means of the boss-like member 68. Mounted above disc 64 adjacent to an outer segmental portion is a reference field assembly or field electromagnet 70 including a laminated U-shaped field structure 72. Field windings 74 and 76 are oppositely wound on respective legs of field structure 72. As shown, the windings are connected in series. The free end of winding 74 is coupled by a phase-shifting condenser 78 to one terminal of the voltage source. The free end of winding 76 is connected to the other terminal of the voltage source. Field windings 74 and 76 are thus also coupled to the input terminals of bridge 10 which are connected to the voltage source.

Mounted below disc 64 opposite the reference field assembly 70 is a signal field assembly or field electromagnet 80 having a laminated E-shaped field structure 82. Wound around the center leg of field structure 82 is a signal field winding 84 connected between ground and center-tap 58 of the amplifier 38. The impedance of winding 84 is made, in known manner, substantially equal to the output impedance of amplifier 38. The impedance of windings 74 and 76 is also made large so as to require a minimum of current for energization. The combined inductive reactance of windings 74 and 76 should be made substantially equal to the inductive reactance of winding 84. Reference to Fig. 2 should again be had for further details of the above construction.

As shown diagrammatically in Fig. 1 the shaft 66 of rotor 62 is mechanically coupled to the slider 28 of potentiometer 22. In addition shaft 66 is mechanically coupled to a cam switch assembly 86, a motor speed control switch 88 and a pointer 90.

Referring to Figs. 1, 2 and 4, cam switch assembly 86 comprises an adjustable cam structure 92, and a switch element 94 comprising a cam follower 96 supported by a resilient member 98 on which is mounted an electrical contact 100. A fixed contact 102 is positioned opposite contact 100. As shown in Fig. 1, the movable contact 100 is electrically connected to the positive terminal of a battery 104. It is to be understood that battery 104 represents any convenient source of direct current of relatively low voltage, say of the order of 26 volts. The negative terminal of battery 104 is connected to ground while the fixed contact 102 is connected through a signal device 106 to ground. Therefore upon structure 92 rotating until the recessed portion 108 is opposite the cam follower 96, contact 100 will engage contact 102 causing the signal device 106 to be energized.

Motor speed control switch 88 is shown in further detail in Figs. 2 and 3. Referring to Figs. 1 to 3 it is illustrated as comprising a movable contact arm 110 provided with a slot 112 and an aperture 114 by means of which it is frictionally supported on a shaft 148. The free extremity of arm 110 is reduced in size to form a pin-like contact portion 118. Upon rotation of shaft 148 the arm 110 is articulated to cause portion 118 to engage one or the other of the fixed contact stops 120 or 122. These stops may be spaced to permit movement of arm 110 through an arc of about 20°. In any case the spacing should exceed the maximum overshoot. As shown in Fig. 1, the contacts 120 and 122 are electrically connected together and to one end of a winding 124, the other end of said winding being connected to ground. Winding 124 is provided with a center-tap 126 which is electrically connected to the positive terminal of battery 104.

As seen from Figs. 1 and 2 winding 124 surrounds one leg of a rectangular magnetic core 128 provided with an air gap 130. The core is positioned relative to the rotor 62 such that the peripheral portion of disc 64 passes between the poles of the magnet defining the gap 130. It should be appreciated from studying Fig. 1 that winding 124 may be considered as divided into two parts, a lower portion connected directly to the source of direct current 104, and an upper portion arranged to be connected through the switch means comprising contacts 120 and 122 and arm 110 to the direct current source 104 in bucking magnetic relation with respect to the lower portion. Core 128 and winding 124 form an electromagnetic means which in cooperation with switch 88 provide selective damping for the rotor 62.

Before describing the operation of the system, further details of the physical embodiment of the invention will be described with reference to Fig. 2. As seen therein all of the mechanically operated elements including the balancing potentiometer 22 are assembled in a single housing 132. The shaft 66 of the servo-motor 60 is journalled in longitudinally adjustable sleeve bearings 134 and 136 secured by lock nuts 138 and 140 respectively. The upper end of shaft 66 is provided with gear teeth 142 which engage a train of reduction gears (not shown) terminating in pinion 144. The details of the gear train are unimportant. In one form of the invention a gear ratio of 300 to 1 was found suitable for causing the pointer 90 to traverse the entire dial in about 5 seconds with both halves of damping winding 124 energized (i. e. no damping).

Pinion 144 meshes with a gear 146 which is coupled to shaft 148 and disc 150 through a friction clutch arrangement comprising the shoulder 152 and the concave annular spring member 154. The shoulder 152 is provided as a part of the cylindrical portion 156 formed integral with the shaft 148. The cylindrical portion 156 is bolted or riveted to the disc 150 by a plurality of bolts or rivets, one of which is shown at 158. Disc 150 is formed from a suitable insulating material such as one of the phenolic compositions. The periphery of disc 150 is provided with two parallel channels or recesses 160 in which are mounted identical cam rings 162, 164 and 166, 168, the details of which can be seen in Fig. 4. These rings are split to enable assembly and provide frictional engagement with disc 150. It should be noted that only one set or pair of cam rings are diagrammatically illustrated at 92 in Fig. 1. The details of switch 94 of Fig. 1 can be seen on the right side of Fig. 2.

A similar switch 170 is provided to cooperate with cam rings 166, 168.

Mounted above disc 150 is a potentiometer assembly comprising a pair of wire wound toroid shaped resistance elements 22 and 171 recessed in an annulus 172 formed of insulating material. Also secured to the annulus are a pair of slip rings 174 and 176 separated from each other by an insulating washer 178. Each slip ring is provided with an electrical connection in the form of a wire lead which is brought to the exterior through a plug connection (not shown) at the bottom of the housing 132. Each of the toroids 22 and 171 is split at one point and the ends brought out by leads to the above mentioned plug. A pair of wiper arms 28 and 180 are secured to the upper surface of disc 150 arranged to engage their respective resistance elements 22 and 171. Each wiper arm is provided with an extension which engages one of the slip rings 174 and 176.

Potentiometer 22 was described with reference to Fig. 1 as being provided to rebalance the bridge circuit 10. The potentiometer 171 can be eliminated, if desired, but is shown here as a means for coupling the gauge with a remote indicator or the like. For example, potentiometer 171 could be connected with a plurality of similar potentiometers associated with other fuel tanks on a given aircraft so as to provide an indication on a totalizing dial of the total fuel on hand.

A cover plate 182 tops the potentiometer assembly and is held in place by a retaining ring 184 within the cylindrical frame 186. The center of the plate 182 is provided with a bushing 188 which serves as the upper bearing for the shaft 148. At the same time it bears against the shoulder 190 on the shaft 148 precluding upward movement of the shaft. The lower end of the shaft is provided with a hollow bore which accommodates the flange 192, bearing 136 and lock nut 140, flange 192 acting as the lower bearing for the shaft 148.

Surmounting the top of shaft 148 is the pointer 90, while the dial face is at 194. The details of the mounting of the motor speed control switch in the space between plate 182 and dial face 194 is best seen in Fig. 3.

A glass window 196 may be provided at the top of the housing 132 as shown, while protective insulation is afforded by a disc 198 below the cover plate 182.

Fig. 4 illustrates the shape of the cam rings 162, 164, 166 and 168 which are all identical. The outer periphery of the ring is formed by two circular arcs of differing radii. When two of these rings are superimposed they provide a cam surface which is best seen in Fig. 1. Manually rotating one ring relative to the other will alter the length of the recessed portion 108 (portion of lesser radius i. e. dwell) thereby varying the proportion of a full revolution of the cam during which the switch 94, for example, is closed.

The general operation of the system and apparatus described to this point should now be evident. Upon a change in capacity of the element 18 due to a change in the quantity of dielectric material between its plates the bridge 10 will become unbalanced developing a signal across resistor 32. This signal will be amplified by the amplifier 38. Tubes 34 and 36 are biased above cut-off and therefore each tube will conduct some current during that portion of the cycle of the source voltage in which the anode of the respective tube is driven in a positive direction. In the absence of a signal across resistor 32, the current passed by the tubes provides a pulsating direct current which flows through winding 84 to introduce damping. However when a signal appears across resistor 32, due to its phase relation with respect to the voltage across secondary winding 52, it will cause one or the other of the tubes 34 or 36 to conduct more heavily than its mate whereupon an alternating current component will be superimposed upon the above mentioned direct current component and supplied to winding 84.

In a manner similar to that in an alternating current watt-hour meter, the currents through the windings of the field structures 70 and 80 will create a moving or shifting magnetic field. This field will induce eddy currents in the disc 64 which in turn react with the magnetic field to cause rotation of the disc. Unlike the watt-hour meter, the field windings have similar reactance and therefore reliance must be placed on capacitor 78 for causing the fields to be in phase quadrature. When the disc rotates it drives the cam assembly 92, the wipers for the potentiometers 22 and 171, the contact arm 110 and the pointer 90. Until arm 110 engages one of the contacts 120 or 122, only the lower half of winding 124 will be energized introducing a damping effect on the disc 64 and permitting slow rotation. For example, the rate might be such that a complete revolution of pointer 90 might take about 12 to 15 seconds.

For the purpose of illustration assume that the capacity of 18 has changed abruptly. This will require appreciable rotation of rotor 62. Therefore a brief moment after rotation commences, the arm 110 will engage one of the contacts 120 or 122 causing the upper portion of winding 124 to be energized. The resultant magnetic field across air gap 130 will fall to zero and rotor 62 will operate free of damping at a higher speed.

In any case, with either low or high speed operation, potentiometer 22 will have its slider 28 adjusted in a direction tending to rebalance the bridge and cause the signal across resistor 32 to approach zero. Due to the momentum of the system the rotor 62 will overshoot causing a reversal in phase of the signal developed across resistor 32, although of slight amplitude. It should be apparent that this will cause the rotor to rotate in the opposite direction. As explained above, contact arm 110 will break away from the contact 120 or 122 restoring the damping field provided by winding 124. This causes sufficiently slow rotation in the reverse direction to substantially eliminate a reverse overshoot. The spacing between contacts 120 and 122 is such that during the short travel back to the balance point the arm 110 will not engage the opposite contact.

If during the rebalancing operation the portion 108 of the cam structure 92 encountered the cam follower then signal device 106 would be energized. In our example of a fuel quantity gauge the first set of cam rings 162 and 164 could be adjusted to energize its signal device when the gauge is reading between empty and one quarter capacity. The other set of cam rings could be adjusted to operate its signal device between three quarter capacity and full thus affording a low level and a high level signal or alarm.

The importance of the direct current component supplied by amplifier 38 should not be overlooked. At the very moment the bridge is approaching balance and the alternating current signal is approaching zero the amplifier is causing structure 80 to provide a direct current field which tends to damp or brake the rotation of the rotor. This is instrumental in minimizing overshoot and permitting more rapid rebalancing operation. It may be thought of as affording inherent damping to the system.

In an alternative embodiment of the invention it is possible to eliminate the speed control switch 88 and substitute as shown in Fig. 5 a small permanent magnet 200 for the electromagnet 128. In this case, however, it is desirable to employ a gear ratio of about 900 to 1.

It should be understood that Fig. 1 illustrates only in simplified schematic form the bridge and amplifier circuits. Additional stages of amplification as well as refinements to the bridge and amplifier circuits may be employed without, however, departing from the principles of operation set forth above. In like manner the structure described with reference to Figs. 1 to 4 is susceptible of numerous modifications and change depending upon the particular use to which it is employed.

What I claim is:

1. A reversible induction motor for use as a servomotor in a servo system wherein there is a balanceable network, responsive to variations in a condition and energized from an alternating voltage source, an adjustable device for restoring network balance, and an amplifier for amplifying network unbalance voltages to develop an amplified unbalance voltage having a magnitude which depends upon the extent of network unbalance and either substantially in phase or substantially 180° out of phase with the phase of the source voltage depending upon the direction of network unbalance, said reversible induction motor comprising: a rotor in the form of a substantially flat disc of electrically conductive material mounted for rotation about a central axis perpendicular to the plane of the disc and adapted for connection to the adjustable device to adjust said device in a direction tending to restore network balance in response to rotation of said disc, first and second electromagnetic means disposed adjacent to a common outer segmental portion of said disc and each having separate winding means for connection respectively to the amplifier output terminals and to the voltage source and arranged to establish respectively an A. C. signal field and an A. C. reference field which have magnetic flux lines cutting the plane of said disc to induce eddy currents therein and which are displaced in time-phase by a predetermined constant phase angle and physically displaced along the path of rotation of said disc to develop, when both winding means are energized upon unbalance of the network, a resultant driving torque produced by the interactions between the field fluxes and the eddy currents induced in said disc, and means for selectively damping the rotation of said rotor, said last-mentioned means comprising a third electromagnetic means positioned adjacent the periphery of said rotor disc so as to effect eddy current braking when energized, a winding for energizing said third electromagnetic means, and switch means operatively connected with said rotor for controlling the energization of said last-mentioned winding such that the rotation of said rotor in response to an appreciable network unbalance will be at a rapid rate with the attendant possibility of overshoot and at a substantially slower rate upon reversal of rotation following such overshoot.

2. A reversible induction motor according to claim 1 wherein said winding for energizing the third electromagnetic means comprises a first portion arranged to be connected directly to a source of direct current, and a second portion arranged to be connected through said switch means to said direct current source in bucking magnetic relation with respect to said first portion, and said switch means comprises a contact arm frictionally supported at one end upon a shaft for rotation therewith through a restricted arc, said shaft being operatively coupled with said rotor, and a pair of electrical contacts fixedly positioned adjacent the free end of said arm, said contacts defining said restricted arc, whereby rotation of said rotor in a first direction causes said shaft and arm to rotate until the free end of said arm engages one of said electrical contacts whereupon further rotation of said shaft in the same direction will occur at said rapid rate accompanied by slippage of said arm about said shaft; and immediately upon reversal of the direction of rotation said arm will leave its position of rest against said electrical contact thereby causing said rotor to rotate at said slower rate.

3. A reversible induction motor according to claim 1, wherein the mounting of said disc is on a central shaft and wherein there is provided an adjustable cam structure having cam surfaces with adjustable dwell length, said cam structure being arranged to be driven by said shaft, and fixedly positioned switch means having cam follower means adapted to engage said cam surfaces for closure during a selected angle of rotation of said cam structure, whereby an output may be obtained indicative of a selected range of rotational movement of said rotor, the range being variable upon adjustment of said dwell length.

4. In a servo system an amplifier having an input and an output; a balanceable network, whose state of balance is determined in part by variations in a condition, having input terminals for connection to a source of alternating voltage and output terminals electrically coupled to said amplifier input and arranged to develop at said output terminals when unbalanced a signal having a magnitude dependent upon the extent of unbalance of said network and either substantially in phase or substantially 180° out of phase with said source depending upon the direction of unbalance of said network, and an adjustable device included in said network for restoring network balance, said amplifier being arranged to amplify said signal without substantial alteration of the phase thereof; and a reversible induction-type servomotor comprising a rotor in the form of a disc of electrically conductive material coupled to said adjustable device to adjust said device in a direction tending to restore network balance in response to rotation of said disc, first and second electromagnetic means each having separate energizing winding means, the winding means of said first electromagnetic means being electrically coupled to said network input terminals, the winding means of said second electromagnetic means being connected by a conductive connection across said amplifier output, said amplifier being biased above cut-off and constructed and arranged to supply a direct current component continuously through said amplifier output to the winding means of said second electromagnetic means, said first and second electromagnetic means being adapted to establish, respectively, a reference field and a signal field with magnetic flux lines cutting the surface of said disc capable of inducing eddy currents therein, said fields being electrically displaced by a predetermined constant phase angle and physically displaced in space along the path of rotation of the disc to develop upon unbalance of said network torque-producing interactions between the field fluxes and the eddy currents induced in said disc, whereby said disc will be driven in a direction depending upon the direction of network unbalance and will adjust said device until the magnitude of the unbalance voltage decreases to zero and network balance is restored, operation of said disc being accompanied by derivative damping due to the direct current component energization of said second electromagnetic means to minimize overshoot and hunting thereof.

5. A reversible induction motor mechanism for use in a servo system wherein there is a balanceable network, responsive to variations in a condition and energized from an alternating voltage source, an adjustable device for restoring network balance, and an amplifier for amplifying network unbalance voltages to develop an amplified unbalance voltage having a magnitude which depends upon the extent of network unbalance and either substantially in phase or substantially 180° out of phase with the phase of the source voltage depending upon the direction of network unbalance, said reversible mechanism comprising: a rotor in the form of a substantially flat disc of electrically conductive material mounted on a central shaft for rotation about a central axis perpendicular to the plane of the disc and adapted for connection to the adjustable device to adjust said device in a direction tending to restore network balance in response to rotation of said disc, first and second electromagnetic means disposed adjacent to a common outer segmental portion of said disc and each having separate winding means for connection respectively to the amplifier output terminals and to the voltage source and arranged to establish respectively an A. C. signal field and an A. C. reference field which have magnetic flux lines cutting the plane of said disc to induce eddy currents therein and which are displaced in time-phase by a predetermined constant phase angle and physically displaced along the path of rotation of said disc to develop, when both winding means are energized upon unbalance of the network, a resultant driving torque produced by the interactions between the field fluxes and the eddy currents induced in said disc, an adjustable cam structure having cam surfaces with adjustable dwell length, said cam structure being arranged to be driven by said disc shaft, and fixedly positioned switch means having cam follower means adapted to engage said cam surfaces for closure during a selected angle of rotation of said cam structure, whereby an output may be obtained indicative of a selected range of rotational movement of said rotor, the range being variable upon adjustment of said dwell length.

6. A reversible induction motor mechanism for use in a servo system wherein there is a balanceable network, responsive to variations in a condition and energized from an alternating voltage source, an adjustable device for restoring network balance, and an amplifier for amplifying network unbalance voltages to develop an amplified unbalance voltage having a magnitude which depends upon the extent of network unbalance and either substantially in phase or substantially 180° out of phase with the phase of the source voltage depending upon the direction of network unbalance, said reversible mechanism comprising: a rotor in the form of a substantially flat disc of electrically conductive material mounted on a central shaft for rotation about a central axis perpendicular to the plane of the disc and adapted for connection to the adjustable device to adjust said device in a direction tending to restore network balance in response to rotation of said disc, first and second electromagnetic means disposed adjacent to a common outer segmental portion of said disc and each having separate winding means for connection respectively to the amplifier output terminals and to the voltage source and arranged to establish respectively an A. C. signal field and an A. C. reference field which have magnetic flux lines cutting the plane of said disc to induce eddy currents therein and which are displaced in time-phase by a predetermined constant phase angle and physically displaced along the path of rotation of said disc to develop, when both winding means are energized upon unbalance of the network, a resultant driving torque produced by the interactions between the field fluxes and the eddy currents induced in said disc, a pair of annular cam members, the cam surfaces lying on the outer periphery of each and defining at least two arcs of differing radii, said pair of members being mounted in juxtaposed relationship for rotation about a central axis perpendicular to the plane of the annular members, both as a unit and relative to one another, said pair of members being arranged to be driven as a unit by said disc shaft, and fixedly positioned switch means having cam follower means adapted to engage said cam surfaces and arranged to close said switch means when said follower means simultaneously comes into engagement with the cam surfaces of lesser radii of both of said cam members, whereby an output may be obtained indicative of a selected range of rotational movement of said rotor, the range being variable upon manual relative rotation of said cam members.

7. A reversible induction motor for use as a servomotor in a servo system wherein there is a variable condition controlled balanceable network having input terminals for connection to a source of alternating voltage, output terminals, and an adjustable device included in said network for restoring network balance, said network being arranged to develop at said output terminals when unbalanced an error signal varying in phase and magnitude as a function of the direction and extent of said unbalance, said reversible induction motor comprising: an eddy current rotor of electrically conductive material mounted for rotation and adapted for operative connection to the adjustable device to adjust said device in a direction tending to restore network balance in response to error signal controlled rotation of said rotor, first and second electromagnetic means disposed adjacent to said rotor and having separate winding means for coupling respectively to said output terminals and to said voltage source and arranged when energized by both the voltage source and the error signal to impart a driving torque to said rotor, and means for selectably damping the rotation of said rotor, said last-mentioned means comprising third electromagnetic means positioned adjacent said rotor so as to effect when energized eddy current braking of said rotor, a winding for energizing said third electromagnetic means, and switch means operatively connected with said rotor for controlling the energization of said last-mentioned winding such that the rotation of said rotor in response to an appreciable error signal will be at a rapid rate with the attendant possibility of overshoot and at a substantially slower rate upon reversal of rotation following such overshoot.

8. A reversible induction motor according to claim 7, wherein there is further provided a rotatable cam structure having cam surfaces with a manually adjustable dwell length, said cam structure being coupled with said rotor in driven manually adjustable angular relationship thereto, and fixedly positioned switch means having cam follower means adapted to engage said cam surfaces for actuation during a selected angle of rotation of said cam structure, whereby an output may be obtained indicative of a selected range of rotational movement of said rotor, the range being variable upon manual adjustment of either or both said dwell length or said angular relationship.

9. A reversible induction motor mechanism for use as a servomotor in a servo system wherein there is a variable condition controlled balanceable network having input terminals for connection to a source of alternating voltage, output terminals, and an adjustable device included in said network for restoring network balance, said network being arranged to develop at said output terminals when unbalanced an error signal varying in phase and magnitude as a function of the direction and extent of said unbalance, said reversible mechanism comprising: an eddy current rotor of electrically conductive material mounted for rotation and adapted for operative connection to the adjustable device to adjust said device in a direction tending to restore network balance in response to error signal controlled rotation of said rotor, first and second electromagnetic means disposed adjacent to said rotor and having separate winding means for coupling respectively to said output terminals and to said voltage source and arranged when energized by both the voltage source and the error signal to impart a driving torque to said rotor, a rotatable cam structure having cam surfaces with a manually adjustable dwell length, said cam structure being coupled with said rotor in driven manually adjustable angular relationship thereto, and fixedly positioned switch means having cam follower means adapted to engage said cam surfaces for actuation during a selected angle of rotation of said cam structure, whereby an output may be obtained indicative of a selected range of rotational movement of said rotor, the range being variable upon manual adjustment of either or both said dwell length or said angular relationship.

10. A reversible induction motor mechanism for use as a servomotor in a servo system wherein there is a variable condition controlled balanceable network having input terminals for connection to a source of alternating voltage, output terminals, and an adjustable device included in said network for restoring network balance, said network being arranged to develop at said output terminals when unbalanced an error signal varying in phase and magnitude as a function of the direction and extent of said unbalance, said reversible mechanism comprising: an eddy current rotor of electrically conductive material mounted for rotation and adapted for operative connection to the adjustable device to adjust said device in a direction tending to restore network balance in response to error signal controlled rotation of said rotor, first and second electromagnetic means disposed adjacent to said rotor and having separate winding means for coupling respectively to said output terminals and to said voltage source and arranged when energized by both the voltage source and the error signal to impart a driving torque to said rotor, a pair of annular cam members, the cam surfaces lying on the outer periphery of each and defining at least two arcs of differing radii, said pair of members being mounted in juxtaposed relationship for rotation about a central axis perpendicular to the plane of the annular members, said pair of members being coupled in individually manually adjustable angular relationship with said rotor to be driven in preselected relationship as a unit thereby, and fixedly positioned switch means having cam follower means adapted to engage said cam surfaces and arranged to actuate said switch means when said follower means simultaneously comes into engagement with the cam surfaces of lesser radii of both of said cam members, whereby an output may be obtained indicative of a selected range of rotational movement of said rotor, the range being variable upon manual adjustment of said angular relationship of either or both of said cam members.

11. In a servo system an amplifier having an input and an output; a balanceable network, whose state of balance is determined in part by variations in a condition, having input terminals for connection to a source of alternating voltage and output terminals electrically coupled to said amplifier input and arranged to develop at said output terminals when unbalanced a signal having a magnitude dependent upon the extent of unbalance of said network and either substantially in phase or substantially 180° out of phase with said source depending upon the direction of unbalance of said network, and an adjustable device included in said network for restoring network balance, said amplifier being arranged to amplify said signal without substantial alteration of the phase thereof; and a reversible induction-type servomotor comprising a rotor in the form of a disc of electrically conductive material coupled to said adjustable device to adjust said device in a direction tending to restore network balance in response to rotation of said disc, first and second electromagnetic means each having separate energizing winding means, the winding means of said first electromagnetic means being electrically coupled to said network input terminals, the winding means of said second electromagnetic means being connected across said amplifier output, said first and second electromagnetic means being adapted to establish, respectively, a reference field and a signal field with magnetic flux lines cutting the surface of said disc capable of inducing eddy currents therein, said fields being electrically displaced by a predetermined constant phase angle and physically displaced in space along the path of rotation of the disc to develop upon unbalance of said network torque-producing interactions between the field fluxes and the eddy currents induced in said disc, and means for damping the rotation of said rotor, said last-mentioned means comprising permanent magnetic means positioned adjacent the periphery of said rotor disc so as to effect eddy current braking of said disc as a function of the velocity of rotation of the disc, whereby hunting of the servo system is kept at a minimum.

12. A reversible induction motor for use as a servomotor in a servo system wherein there is a balanceable network, responsive to variations in a condition and energized from an alternating voltage source, an adjustable device for restoring network balance, and an amplifier for amplifying network unbalance voltages to develop an amplified unbalance voltage having a magnitude which depends upon the extent of network unbalance and either substantially in phase or substantially 180° out of phase with the phase of the source voltage depending upon the direction of network unbalance, said reversible induction motor comprising; a rotor in the form of a substantially flat disc of electrically conductive material mounted on a central shaft for rotation about a central axis perpendicular to the plane of the disc and adapted for connection to the adjustable device to adjust said device in a direction tending to restore network balance in response to rotation of said disc, first and second electromagnetic means disposed adjacent to a common outer segmental portion of said disc and each having separate winding means for connection respectively to the amplifier output terminals and to the voltage source and arranged to establish respectively an A. C. signal field and an A. C. reference field which have magnetic flux lines cutting the plane of said disc to induce eddy currents therein and which are displaced in time-phase by a predetermined constant phase angle and physically displaced along the path of rotation of said disc to develop, when both winding means are energized upon unbalance of the network, a resultant driving torque produced by the interactions between the field fluxes and the eddy currents induced in said disc, means for damping the rotation of said rotor, said last-mentioned means comprising permanent magnetic means positioned adjacent the periphery of said rotor disc so as to effect eddy current braking of said disc as a function of the velocity of rotation of the disc, an adjustable cam structure having cam surfaces with adjustable dwell length, said cam structure being arranged to be driven by said shaft, and fixedly positioned switch means having cam follower means adapted to engage said cam surfaces for closure during a selected angle of rotation of said cam structure, whereby an output may be obtained indicative of a selected range of rotational movement of said rotor, the range being variable upon adjustment of said dwell length.

References Cited in the file of this patent

UNITED STATES PATENTS

| | | |
|---|---|---|
| 1,972,987 | Gardeen | Sept. 11, 1934 |
| 2,075,083 | Bernarde | Mar. 30, 1937 |
| 2,191,606 | Butler | Feb. 27, 1940 |
| 2,237,142 | Holtz | Apr. 1, 1941 |
| 2,475,270 | Yardeny | July 5, 1949 |
| 2,604,525 | Zannettos | July 22, 1952 |
| 2,648,058 | Breedlove | Aug. 4, 1953 |

OTHER REFERENCES

Publication "Electronics," April 1950, pp. 77–79.

"Electronic Instrument," Greenwood, Holdam and Macrae, McGraw-Hill Book Co., 1948, p. 440.

Standard Handbook for Electrical Engineer, 7th edit., page 169, 2nd par., and Fig. 75; McGraw-Hill, New York, 1941.